United States Patent [19]

Bennett et al.

[11] 3,947,127

[45] Mar. 30, 1976

[54] OPTICAL COMPONENT FUNCTIONAL TESTER

[75] Inventors: Harold E. Bennett; Marion J. Soileau, both of China Lake, Calif.; Guilford J. Hutcheson, Huntsville, Ala.

[73] Assignee: The United States of America as represented by the Secretary of the Navy, Washington, D.C.

[22] Filed: Nov. 11, 1974

[21] Appl. No.: 522,388

[52] U.S. Cl. ................ 356/124; 250/228; 250/233; 356/128
[51] Int. Cl.² ..................... G01B 9/00; G01B 11/30
[58] Field of Search .......................... 356/124–128, 356/107, 109; 250/228, 232, 233; 331/94.5, DIG. 1

[56] References Cited
UNITED STATES PATENTS

| | | | |
|---|---|---|---|
| 3,160,752 | 12/1964 | Bennett | 250/347 |
| 3,436,154 | 4/1969 | Baker et al. | 356/124 |
| 3,761,179 | 9/1973 | Plummer et al. | 356/212 X |

*Primary Examiner*—Siegfried H. Grimm
*Attorney, Agent, or Firm*—R. S. Sciascia; Roy Miller

[57] ABSTRACT

An optical testing apparatus for use in non-destructive testing of optical components to evaluate their operational requirements. The optical component to be tested is mounted on a fixture that allows its accurate alignment and rotation so the entire surface area of the optical component can be scanned in discrete areas. A laser light source is positioned to illuminate the optical component with coherent light beams or rays. An aperture positioned in the light beam permits adjustment of the diameter of the light beam impinging on the optical component to be evaluated. Whenever an imperfection is present in the optical component a portion of the light rays illuminating the imperfection will be disarranged or scattered. Both the non-scattered and scattered light rays are gathered by means of pyroelectric detectors and their outputs are compared for obtaining an electrical signal that is proportional to the intensity of the scattered light caused by the imperfection. A visual chart is made of this signal by means of a recorder to indicate the magnitude of the scattered light which can be related to the materiality of the imperfection with respect to its intended utilization.

6 Claims, 2 Drawing Figures

OPTICAL COMPONENT FUNCTIONAL TESTER

BACKGROUND OF THE INVENTION

The invention relates to an apparatus for testing the optical qualities and coatings of optical components by determination of the magnitude of light rays or waves disarranged by an imperfection either on the surface or internally of the optical component.

It is important in many modern weapon applications to achieve a high degree of sensitivity to light rays emitted from a target. This is especially true of missiles incorporating infrared detectors utilized for sensing a target and guiding the missile to the area of the target by means of the infrared energy sensed. These missiles normally have a dome, to protect the detector, which is transparent to the frequency of the infrared energy to be detected. Imperfections on the dome surface or interenally to the material of the dome masks the infrared rays passing through the dome to the detector due to scattering or diffusion of the infrared rays. This can cause missile insensitivity to weak target signals created solely by the dome itself and can seriously degrade missile performance.

Another area where imperfections in optical components could have a deleterious effect on over-all system performance is in the field of fire control instruments that utilize optical components such as lenses, prisms, mirrors, reticles, windows, wedges and the like. Any defects in the optical glass utilized in the manufacture of these devices or major scratches on their surfaces could have a harmful effect in that the sensitivity of the instrument could be seriously degraded by scattering of a portion of the light rays passing through the components.

Realization in both industry and government of the effect of the quality of optical components on over-all system performance has caused the establishment of certain required testing techniques and standards to accurately measure the surface roughness of manufactured optical components. The testing technique utilized at present that has wide acceptance throughout the manufacturing industry is a determination of the magnitude of scratches and digs existing on the surface of an optical element. Certain standards have been established over a long period of time that define the quality of the lens or other device tested by the number, length, depth and location of the scratches and digs present on the surface. One method of measuring these defects is by moving a stylus tip across the imperfection and relating the vertical movement of the tip to a predetermined established standard for the particular imperfection found. It can be appreciated that this technique has some major drawbacks when working on optical components where there is a requirement for a supersmooth surface. Certain inherent inadequacies such as size of stylus tip and skill of the test operator may prevent detection of imperfections that would otherwise cause rejection of the optical components. In addition a stylus tip could cause scratches as it is moved across the optical component surface and these scratches could result in destruction of the tested component.

Another inspection technique accepted by the government and optical industry is a comparative test which is accomplished by comparing a standard optical component that has been engraved with standard scratches and standard digs. Optical inspection personnel grade the optical component being inspected by "eyeball" comparison of its imperfections to those standard imperfections on the optical standard. A test such as this causes great variations to exist from manufacturer to manufacturer as well as between different optical inspection personnel since the skill of individual inspectors vary as well as their judgement and estimating ability. In view of this lack in the industry there is a need for an instrument that will give an objective test based on measurements that can characterize optical components objectively in terms of functional parameters in the systems where the optical components are utilized and in terms compatible with presently accepted standards.

The present optical testing apparatus overcomes all of these defects inherent in the present testing techniques discussed above and in addition permits tests of optical performance of components that are not possible to specify using present day standards. Optical components other than glass can be tested and also the instrument can be used to determine the quality of transparent and opaque components in the visible and infrared spectrum. Further the inventive apparatus is capable of measuring surface, surface coating and bulk optical properties objectively without reliance on the skill or judgement of inspection personnel.

SUMMARY OF THE INVENTION

Accordingly the general purpose of the invention is to provide a technique to determine the quality of optical components by a objection test that gives a numerical measurement of the light scattering level caused by discrete imperfections on the surface or internally of the optical component. The instrument is capable of utilization in functional testing of various optical devices such as lenses, prisms, domes and the like over the spectral light range of their intended use. A coherent light source supplies light rays or waves to an optical test sample mounted on a jig in order to provide accurate positioning and alignment of the optical component. A microprobe fiber optic device is used to accurately give an indication of the test piece in relation to the coherent light rays striking the test piece. Scanning of the test piece by movement of the jig support allows discrete portions of the test piece to be illuminated. Light rays striking imperfections in this portion will be scattered and picked up by a detector positioned at the focal point of the Coblentz sphere. Anoher detector picks up the coherent light rays passing through the test piece and sphere. Proportional electrical signals are generated by each detector that is indicative of the light intensity striking them. These electrical signals are processed to give an electrical ratio signal that is visually recorded on a chart paper.

A chopper arrangement permits passage and blocking of the light rays in order to interrupt it at regular intervals to provide a fixed frequency. This facilitates the detection and amplification of the electrical signals generated in response to the light impinging the pyrodetectors. A filter is used whenever the system is operating in the infrared spectrum. This filter is placed between the laser and the component being tested. The filter can aid in the elimination of stray, incoherent visible light from the laser which may be present when the laser is tuned for an infrared line. An aperture is inserted between the chopper and the optical component being tested to constrain or limit the light beam and to eliminate diffracted light from the edges of the chopper blade mechanism.

BRIEF DESCRIPTION OF THE DRAWINGS

For a complete understanding of the nature and features of the invention, reference should be made to the following detailed descriptions taken in connection with the accompanying drawings wherein:

FIG. 1 is a diagrammatic representation of the optical functional tester illustrating the apparatus arrangement for testing the quality of an optical component such as a lens, prism, dome or the like.

DESCRIPTION OF THE PREFERRED EMBODIMENT

Figure 1:
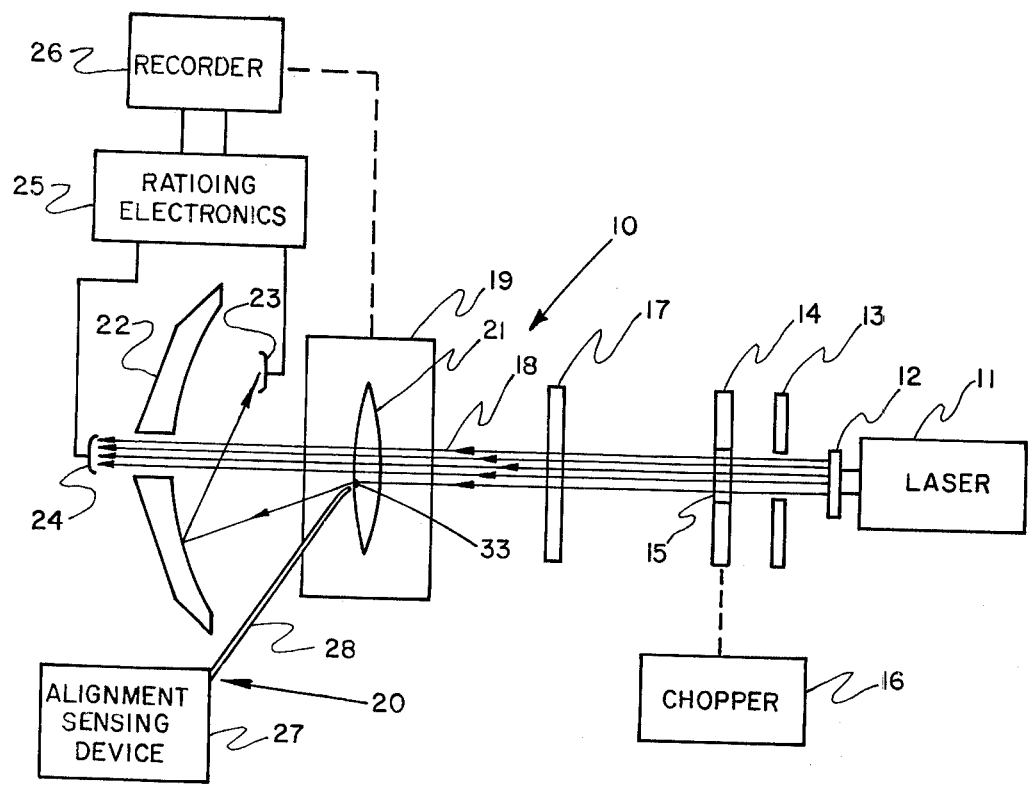

Referring now to the drawings, more particularly to FIG. 1, the optical component function tester apparatus is generally indicated by numeral 10 that illustrates a diagrammatic representation of the testing of an optical component.

The optical device to be tested, here illustrated as a convex lens 21, is mounted on jig 19. It is to be understood that lens 21 is shown for illustrative purposes only and the apparatus as shown may be used to evaluate the quality of numerous other optical components such as prisms, domes, windows, coated lenses and the like. Jig 19 may be rotated and moved by a mechanical mechanism not shown, to allow light beam 18 to illuminate a chosen discrete point or area on the surface of lens 21.

A fiber optic microprobe indicated generally by numeral 20 will accurately and reliably aid in the initial axial alignment of the optical component with respect to light beam 18. Relatively long thin multichannel light rod 28 positioned closely adjacent the surface of component 21 permits an indication of the magnitude of light reflected from its surface to give a visual indication at alignment sensing device 27. The transmitting light rods may comprise two fiber glass rods to transmit light from a light source in sensing device 27. A centrally disposed third rod receives the light reflected by the surface of the test piece and transmits it to a visual indicator incorporated in the sensing device to give a maximum reading which indicates that the surface of the test piece is equidistant from the two light transmitting rods. Other alignment means may be used to accomplish accurate alignment such as mechanical measuring devices or the like, but is has been found through experimentation that a fiber optic microprobe as described gives the best and most accurate alignment results.

To illuminate the test piece or optical component 21 a HeNe laser 11 is used to generate a coherent light beam 18 through optical component 21. Laser 11 has a lens system 12 and an aperture 13 to control the diameter of light beam to a predetermined fixed size for proper illumination of the type of optical component being tested. It is to be understood that aperture 13 although shown as fixed may be adjustable to vary the diameter of the light beam 18.

Chopper mechanism 14 illustrated as wheel 15 has a number of segments and is driven at a predeteremined speed by means of chopper 16. Spaced segments 15 alternating block and pass portions of light beam 18 to give a pulsing light beamm of a frequency dependent on the speed and number of segmented portions of wheel 15. Although many chopper speeds may be utilized it has been found that good results are obtained by use of a chopper that gives an 11 hertz frequency. Filter element 17 may be placed in light beam 18 whenever the apparatus is operating in the infrared spectrum. Placement of the filter 17 between the laser 11 and component 21 that is being tested eliminates stray, incoherent visible light from the laser which may be present when the laser is tuned for an infrared line.

Still referring to FIG. 1, the light receiving portion of optical functional tester apparatus 10 is shown as made up of four major elements, a Coblentz sphere 22, a reference pyroelectric detector 24, a scattered light pyroelectric detector 23, ratioing electronics block 25 and a recorder element 26.

Coblentz sphere 22 is positioned behind test piece 21 and allows passage of coherent light rays or waves making up beam 18 through a centrally located passageway. Light rays impinging pyroelectric detector 24 cause an electrical signal to be generated that is proportional to the total light intensity. Another pyroelectric detector 23 generates an electrical signal from the scattered light rays caused by an imperfection illustrated by numeral 33. The Coblentz sphere acts as a collecting mirror for the scattered light rays striking its surface and these rays are directed to its focal point where detector 23 is positioned. An electrical signal proportional to the scattered light intensity is generated and coupled to ratioing electronics circuitry depicted as block 25.

A recorder mechanism 26 is electrically coupled to receive the ratio signals and give a visual indication of the magnitude of the scattered light. The visual indication may be a meter reading or a recording on chart paper. A mechanical mechanism indicated by the dotted line connects the recorder to the jig and permits the recorder to be calibrated to indicate the position of the test piece as it rotates in light beam 18 during the scanning process.

In operation the optical component is affixed in jig 19 and is aligned to light beam 18 by means of alignment sensing apparatus 20. Beam 18 is restricted in diameter by aperture 13 and chopped into a predetermined pulse rate by chopper mechanism 16. Beam 18, made up of individual light rays, passes through test piece 21 and impinge on detector 24. If an imperfection is present in the test piece such as illustrated by 33 a portion of the rays will be scattered anf reflected from the surface of Coblentz sphere 22 to impinge pyroelectric detector 23. Electrical signals generated in response to the light intensity falling on the respective detectors is electrically coupled to ratioing electronics circuitry 25. An electrical output from circuitry 25, that is proportional to the scattered light intensity, is electrically coupled to recorder 26 which records the magnitude of the light intensity.

In order to completely survey the entire test piece 21, beam 18 may be scanned over discrete portions of piece 21. This may be accomplished by adjustment of the jig mechanism so that it causes the test piece 21 to move in a reciprocating motion normal to beam 18. Another scanning method that gives good results is to spirally scan test piece 21 starting the spiral from the outer circumference and working toward the center. This technique allows the recorder to be mechanically coupled to jig 19 so that the location of the beam on test piece 21 is correlated to calibration marks on the chart paper to allow the relative location of any imperfections to be determined.

Figure 2:
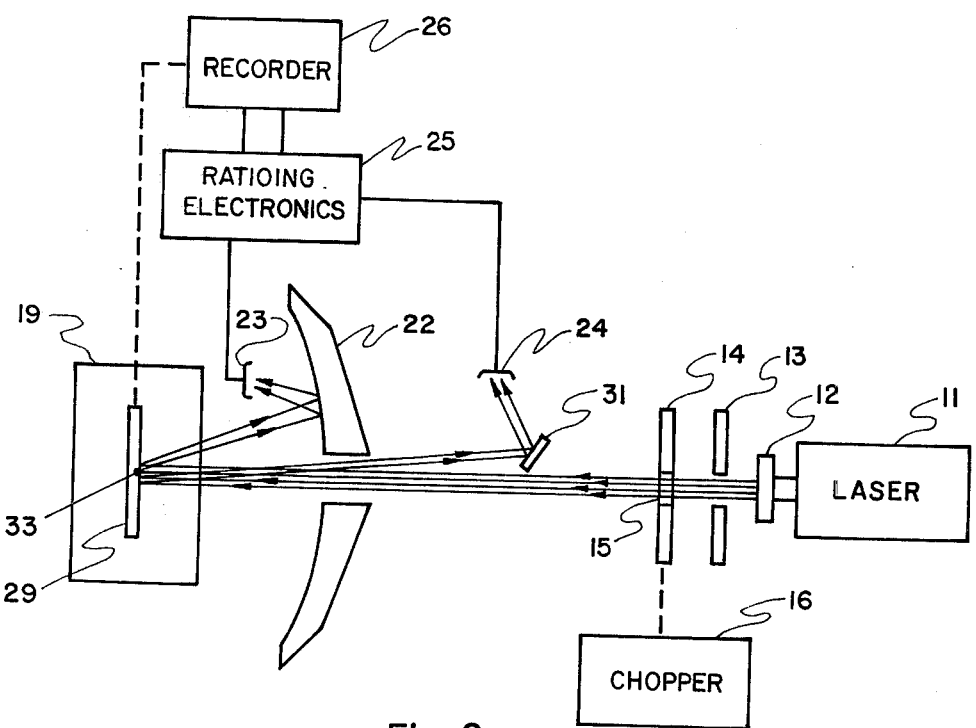
FIG. 2 is a diagrammatic representation of a modification of the optical functional tester illustrating the apparatus arrangement for testing an optical component such as a mirror.

For locating imperfections in optical components that reflect rather than pass a light beam a modification in the structure shown in FIG. 1 is necessary. This modified structure is shown in FIG. 2 wherein like structural elements have the same numerical designation.

Laser light source 11 generates beam 18 toward the rear portion of Coblentz sphere 22 for passage through a centrally located passageway to allow beam 18 to impinge on the mirror surface of reflective test piece 29. Light rays that do not strike an inperfection are reflected back through the passageway of Coblentz shere to mirror 31. Detector 24 picks up these rays and transmits an electrical signal proportional to the light intensity striking its surface. Any imperfections cause scattered light which is picked up by detector 23 located at the focal point of Coblentz sphere 22. Mirror test piece 29 may be orientated during initial alignment by an alignment means 20 as shown in FIG. 1 in order to permit light rays to strike mirror 31. Operation of the apparatus shown in FIG. 2 is similar to the apparatus of FIG. 1 as described above.

It is apparent from the foregoing that the inventive apparatus described and shown above provides an apparatus that effectively furnishes a quantitative and non destructive technique of obtaining measurements that can be correlated to standards established in the optical industry for unacceptable light scattering in optical components utilized in various systems. The apparatus reduces to a minimum the skill and judgement of the optical inspector in determining whether a particular optical unit is of acceptable quality for use in a particular application. Utilization of the apparatus will reduce the cost of optical systems and eliminate unnecessary rejection of optical components for a given system since an accurate and reliable measurement of the quality of the optical component will now be possible based on an actual measurement, thus eliminating variations in quality determination due to personal judgements of the optical inspectors.

Obviously many modifications and variations of the present invention are possible in the light of the above teachings. It is therefore to be understood that within the scope of the appended claims the invention may be practiced otherwise than as specifically described.

What is claimed is:

1. An optical testing apparatus for testing the quality of optical components comprising:

support means for mounting said optical component to allow rotation for incremental scanning of its total surface area;

coherent light source for illuminating said optical component on said support means with parallel light rays;

a chopper means located between said optical component and said light source for breaking the light rays in a series of pulses of a predetermined frequency;

adjustable aperture means positioned between said coherent light source and said chopper means for limiting the number of light rays that illuminate said optical component;

accumulator mirror means located adjacent and behind said optical component having a centrally located perforation for allowing passage of parallel light rays;

first collecting means located adjacent and behind said accumulator mirror means relative to said optical component, for collecting all parallel light rays and supplying an electrical signal proportional to the light intensity impinging said first collecting means;

second collecting means located between said optical component and said accumulator mirror means for collecting light scatteredd by said optical component; said second collecting means supplying an electrical signal proportional to said light intensity impinging said second collecting means;

comparative means for receiving electrical signals generated by said first collecting means and said second collecting means for supplying an electrical signal output that is proportional to the ratio of the two signals; and recorder means electrically coupled to receive the electrical output from said comparative means for visually displaying the magnitude of the scattering light level;

whereby movement of the support means allows the light to be scanned over discrete portions of the optical component for determination of surface imperfections.

2. The apparatus of claim 1 wherein the coherent light source comprises
a laser light source.

3. The apparatus of claim 1 further comprising an infrared filter element located between said coherent light source and said optical component for eliminating stray, incoherent visible light generated from said coherent light source.

4. The apparatus of claim 1 wherein said chopper means breaks the light rays in a series of pulses in the frequency range of 11 Hertz.

5. The apparatus of claim 1 wherein said accumulator mirror means is a spherical mirror.

6. The apparatus of claim 5 wherein said spherical mirror is a Coblentz sphere.

* * * * *